United States Patent Office 3,479,300
Patented Nov. 18, 1969

3,479,300
CARBONACEOUS PRODUCTS
Donald Rivin, Framingham, Mass., and Jerome Aron, Providence, R.I., assignors to Cabot Corporation, Boston, Mass., a corporation of Delaware
No Drawing. Filed Oct. 22, 1965, Ser. No. 502,600
Int. Cl. B01j 11/06
U.S. Cl. 252—430                                              34 Claims

ABSTRACT OF THE DISCLOSURE

The present invention provides novel carbon catalyst compositions and a process for the production thereof. Broadly speaking, the catalyst compositions of the present invention comprise negatively charged carbon particles, the surfaces of which have electron rich portions (anion sites) and portions having free unpaired electrons (free radical sites). Additionally, the compositions comprise a solvating ether. The production of the catalytic compositions of the invention can be effected by treating carbon particles with an alkali or alkaline earth metal and subsequently treating the resulting carbon/metal composition with a solvating ether. The carbon portions of the catalytic compositions of the present invention can be reacted with various reagents to produce carbon compositions heretofore thought unavailable.

---

It has been known that carbon blacks could be modified by subjecting them to chemical treatments whereby chemicals would be selectively adsorbed upon the surface of the carbon black. Such processing techniques were, of course, limited by the physics of the adsorption process. For example, groups had to have particular electronic characteristics to be properly adsorbed onto the surface of carbon black or groups had to have a particular size in order to be absorbed into the pores in a carbon black particle. Thus, there was little versatility in the processes formerly known to the art, each process being applicable only to impart a limited number of useful properties to the carbon black being treated.

Carbon black has been considered to be a generally inert material having insignificant reactivity with other chemicals. For example, even activated carbon has been considered an inert carrier for alkali metals like sodium.

Applicants, however, have now discovered that, under certain controlled conditions, carbon and, most advantageously, carbon black may be reacted directly with a very wide range of chemical radicals. This discovery has important implications in that selected chemical groups can be added to carbon black surfaces quite independent of the absorbing or adsorbing characteristics which carbon black has for the particular group being added. Thus, even polymerizable radicals can be added to carbon black and, indeed, polymers can even be prepared incorporating carbon black particles and/or having carbon black particles as their terminals.

Such polymers are of high interest in reseach relating to the nature of carbon black-elastomer bonding, the abrasion of filled elastomers, etc. Furthermore, since various organic chemical groups of basic or acidic character can be added to carbon black according to the process of the instant invention, blacks can be modified to disperse rapidly and under optimum conditions in a wide variety of dispersion media such as are used in the preparation of lacquers, inks, etc. Still further, such blacks may be used as scavengers for destroying residual catalyst in elastomers with which the black is compounded. Such carbon blacks may also be used directly as catalysts in polymerization of some monomers with which the black has been compounded. Furthermore, some of the blacks of the invention may be used as oxidation inhibitors. Moreover, as will be discussed in more detail hereafter, the process of preparing the chemically-substituted carbon blacks of the invention utilizes a novel and active catalytic carbon black material which has a variety of uses in the chemical arts including catalysis of polymerization reactions such as anionic- and radical-initiated reactions.

Other utility for such chemically modified carbon blacks exist in the field of elastomer and plastic reinforcement and pigmentation and lacquer and ink pigmentation. For example, aminated carbon blacks in materials like polybutadiene, natural rubber, and butyl rubbers modify the modulus and torsional hysteresis of such materials. Allylic modified carbon blacks have utility in modifying these same properties, as do carbon blacks modified with sulfur-bearing groups. Furthermore, substituted carbon blacks can be used alone or in composition with other materials such as silica to form ablative structures useful in rocket applications and the like.

Therefore it is an object of the invention to provide a process whereby chemical substituents can be selectively added to carbon black.

It is another object of the invention to provide carbon blacks having properties modified by the direct chemical substitution thereon with any of various chemical groups.

It is another object of the invention to prepare polymers comprising carbon black particles.

It is still another object of the invention to provide carbon black which can be easily dispersed in polymers, lacquers, both polar and non-polar solvents, and the like.

It is a further object of the invention to provide a catalytic material based on carbon black.

It is a further object of the invention to prepare carbon blacks which, in effect, "carry their own dispersing agent with them."

It is another object of the invention to provide polymers having carbon black in direct chemical linkage therewith and a process for preparing the same.

It is another object of the invention to provide a process utilizing a carbon black "radical-anion" as a polymerization catalyst.

Other objects of the invention are in part obvious and in part pointed out hereinafter.

Applicants have substantially attained the aforementioned objects by a process wherein carbonaceous materials such as lampblack, charcoal, or carbon black are heated in the presence of sodium or a similar metal to temperatures above about the melting point of said metal and simultaneously or subsequently treated with a solvating ether medium which is inert to anion sites and to the metal to form on the carbon black negative sites (henceforth called anion sites) plus unpaired electron sites (henceforth called radical sites). A metal cation is also formed in the reaction. The resulting novel carbon blackbased product, henceforth referred to as the "carbon radical-anion," is then reacted with groups capable of reacting with radicals, electrophilic group-containing reagents, and the like.

The manner in which the heating of the carbon in the presence of the metal is accomplished is quite important. While temperatures of less than the melting point of the metal can be utilized under some circumstances, for example when a good mechanical mixture of the metal and carbon is achieved, temperatures above said melting point, must normally be utilized in order to coat the carbon with the metal and produce optimum results with the least expenditure of ingredients.

In addition, the ultimate yield of radical-anion sites subsequent to treatment of the metal-coated carbon with a solvating ether medium is highly dependent upon the surface area of the carbon black utilized. Thus, carbonaceous materials having an average particle diameter of less than about 1 micron, and preferably carbon blacks, especially carbon blacks having an average particle diameter of less than 0.1 micron, are preferred. In addition, the preferred carbon blacks are those which have little or not porosity, low volatile content and no free or physically bound moisture on the surface thereof. By utilizing these preferred carbon blacks, it is readily possible in accordance with the present invention to produce carbon blacks having at least $5 \times 10^{-5}$, and most preferably $1 \times 10^{-4}$, active sites per gram of carbon on the exterior surface thereof.

The quantity of metal such as sodium metal which should be used can vary over a wide range. In general, said quantity need not exceed the quantity required to form a monolayer of metal about the entire surface of the carbon. Normally, somewhat less than said amount will be used.

The treatment of the metal-coated carbon with a solvating ether to produce the carbon-radical anion may be represented by the following equation wherein sodium is utilized as the metal for the purposes of illustration:

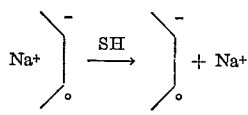

wherein

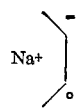

represents the sodium-coated surface of a carbon black crystallite, — represents an anion site thereon, and ° represents a free radical site thereon. SH represents a solvating ether, such as dimethoxyethane, within the scope of the present invention.

The treatment with a solvating ether medium to produce a carbon radical-anion can be accomplished with compounds such as 1,2-dimethoxyethane, tetrahydrofuran, alkylated tetrahydrofurans like methyl tetrahydrofuran and the like. In general any members of that class of solvating ethers which stabilize alkali metal ions without reaction therewith are generally operative. 1,2-diethoxyethane, dimethylether and dioxane are specific members of this group of solvents.

Among some of the typical reagents which can be chemically reacted with the carbon radical anion and the chemical groups added to carbon black by the reaction are the following:

TABLE I

| Reagent: | Substituent group |
| --- | --- |
| $H_2O$ | —H |
| $CO_2$ | —COOH |
| COS | —COSH |
| $CS_2$ | —CSSH |
| $SO_2$ | —SOOH |
| RX | —R |
| ArX | —Ar |
| NO | —N=O |
| $O_2$ | —OOH |
| $Cl_2$ | —Cl |
| CO | —C=O, H |
| $RCH_2OH$ | —C—OH, R, H |
| AX | —A |

In Table I, R represents any alkyl group, for example methyl, propyl, or dodecyl; Ar represents any aralkyl or alkaralkyl group such as benzyl, or ethyl benzyl and X stands for any halogen atom. A represents an aryl radical, for example a phenyl or polycyclic radical.

However, it must be clearly understood that Table I and the information therein are presented for the purposes of quickly illustrating the scope of the invention. The reactants listed therein are only a very small number of those which can be reacted with the carbon radical-anion to form unique chemical materials by the instantly disclosed method.

For example, in addition to the alkyl and aralkyl groups and acid-type substituents listed in Table I, some additional substituents which can be added to the anion site are hydroxyl and mercaptan-bearing radicals, amino-containing radicals, radicals containing either linkages, nitrile type radicals and amido radicals. Various aryl radicals can be chemically attached to the carbon radical-anion. Moreover, the carbon radical-anion can be reacted with halo-substituted ureas like di-ethyl chloro carbonyl, and salts like chloro ethyl sulfonate. Further substituents can be used. Unsaturated groups can be added to the carbon radical-anion by reacting such materials as allylic halides and crotonic halides therewith.

Hydroxyl group-containing substituents can be conveniently added to the carbon radical anino by reaction of halogenated alkyl alcohols like chloropropanol, ethylene chlorohydrin, chlorohexanol bromobutanol and the like. Mercaptan group-containing substituents can be added in the same general manner as will be obvious to those skilled in the art on reading the instant disclosure.

Acid group-containing substituents can be added by reacting such acids as benzylchlorocarboxylic acid, bromopropionic acid, chloroacetic acid, and like organic acids with the carbon radical-anion. The alkali metal salts of these acids are often more conveniently used in the process of the invention than the free-acid form thereof. Here too, analogous halogenated sulfur-containing acids such as mercapto and thiol acids can be used as a means for producing products of the invention.

Amino group-containing radicals can be added by reacting halogenated amines like bromoethylamine, chlorotriethylamine, and halogenated diamines like

Primary, secondary, tertiary or quaternary amines can be used.

Ether conatining groups can also be added by reacting any of a wide range of halogenated compounds like epichlorohydrin, chlorinated ketones such as chloroacetone, mono-chlorinated ethyl ether and the like.

Halogenated nitriles like chloromethylnitrile and chloroethylnitrile can be reacted with the carbon radical-anion to form nitrile-substituted carbon compositions.

Halogenated amides such as chloroacetamide and the chloroalkyl homologs thereof can be reacted with the carbon radical-anion to form a series of amidized carbon black materials.

Moreover, the direct aryl substitution of the carbon black can be obtained by reacting such aromatic compounds as 1-chloro-2,4-dinitrobenzene and 1,4-dichlorobenzene, parachloroaniline, and 1-chloro-2,4-dinitronaphthalene with the carbon radical-anion.

Thus it is clear that almost a limitless number of halogenated alkyls and halogenated substituted alkyls can be reacted with the carbon radical-anion to form novel materials which have substantially different chemical properties than the properties of carbon blacks heretofore known to the art.

As will be obvious to those skilled in the art on reading this specification, it is normally necessary however to limit the use of acidic material which material would donate an anion-terminating proton or the equivalent. However, it is to be understood that there is no intention to limit the disclosure of useful reactants to halogenated materials. Other chemicals can be selected from those groups of chemicals suggested by the above disclosure which will be recognized by those skilled in the art as capable of forming anions, other than halogen anions, which anions are removable therefrom by the process of the invention. Among such other chemicals will be many of those having instead of an active halogen, an active nitro group, an active hydroxyl group or the like.

Among the reagents capable of reacting with the radical site are the free radical and radical seeking reactants known to the art. These include such varied compounds as the halogens, $O_2$, NO, $NO_2$, disulfides, diphenylpicrylhydrazyl, aromatic nitroso compounds, quinones, hydroquinones, and the like. On reading the instant disclosure, those skilled in the art will readily recognize the aforementioned compounds to be highly reactive with radical sites. They are commonly referred to as radical terminators and are hereafter called "radical traps."

However, other somewhat less active reagents such as the alkyl alcohols, ethanol, isopropanol and the like and carbon monoxide are also reactive with radicals to form reaction products with the radical site of the carbon radical-anion.

In such reactions, it is believed that the radical site on the carbon black attacks the carbon nearest to the alcohol group and attaches thereto. The addition of a peroxide compound will promote such a reaction.

When a carbon radical-anion is reacted with a protonic acid, a protonation takes place (in addition to hydrogen abstraction from the solvent):

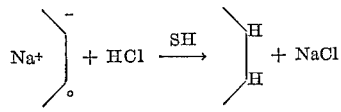

If a carbon radical-anion is reacted with an electrophilic group-contributing reagent like $CO_2$ in a solvent medium like that described above, the following reaction takes place:

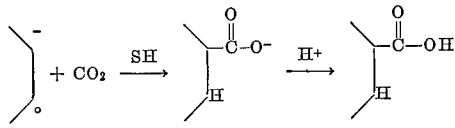

wherein the hydrogen which attaches to the radical site is abstracted from the solvent.

When a carbon radical-anion is reacted with a radical trap reagent like NO, in an ether solvent such as described above, the following reaction takes place:

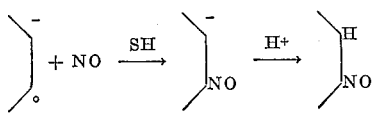

where the hydrogen is attached to the anion site by a separate protonation.

When a compound like butylbromide is reacted with a carbon radical-anion in a hydrogen-donating ether solvent such as described above, the following reaction takes place:

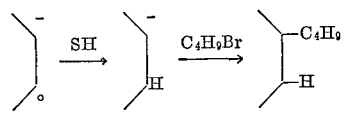

wherein the hydrogen which attaches to the radical site is abstracted from the solvent.

Thus it is clear that a large variety of chemical groups can be added by direct chemical linkage to carbon black because of the extraordinary versatility of the carbon radical-anion in accepting chemical groups of different kinds.

It is usually desirable to react these radical traps with the carbon black during the formation of the radical-anion in the ether solvent medium. At such time, the radical trap has greater opportunity to compete favorably with any hydrogen abstracted from the solvent for the radical site being prepared on the carbon surface.

The products of the invention will normally have hydrogen added to the carbon black crystallite by solvent abstraction or protonation depending upon the type of reactant used. However, it should also be noted that this result can be avoided by using a suitable chemical group for example a radical trap such as NO or an alkylating agent (such as $H_3CBr$) which will satisfy the radical and the anion sites respectively. Clearly the option to use such radical traps and such compounds as $H_3CBr$ in this way allows further flexibility in providing specially tailored carbon blacks to meet specific requirements. Such radical traps are known to the art and may be selected by those skilled in the art on reading this disclosure. Compounds which are referred to herein as "radical traps" include that class of compounds referred to as free radical "inhibitors" and "retarders" by Cheves Walling in Free Radicals in Solution, John Wiley and Sons, New York, 1957.

In some instances, it will be seen that the preferred conditions for forming a carbon black substituted with a particular group will not be favorable for reaction with a particular radical trap. Usually, however, if low hydrogen content is for some reason desirable, one or another of the radical traps known to the art can be used to occupy the site which would normally be occupied by a hydrogen abstracted from the solvent.

The reactivity of carbon radical-anions which have been prepared with various alkali metal elements will vary. For example, if addition of hydrogen to the carbon black is used as a basis of comparison, and complete hydrogen addition at both the free radical and anion sites is arbitrarily selected as 200% based on a 100% sodium monolayer (i.e. two hydrogens may be attached to the black for each sodium atom of the monolayer), under the same set of reaction conditions and equal monolayer coverings, the carbon black radical-anion prepared with sodium can be 104% hydrogenated; a radical-anion prepared with lithium will be only 63% hydrogenated and a radical-anion prepared with potassium will be 118% hydrogenated. These results were obtained from experimental runs wherein the radical-anions were allowed to form for only four hours in dimethoxyethane and are useful for purposes of comparison of the utility of various alkali metals, but these results do not represent highest levels of hydrogenation possible of attainment.

Certain metals other than alkali metals, for example those such as calcium, can be used under some circumstances, i.e. when the high melting point desirably attained for forming a monolayer can be tolerated by the carbon being reacted therewith.

Among polyemers which can be formed by the process of the invention are those attached directly to the carbon radical-anion sites of the carbon black. In general monomer units useful for forming said polymers are those containing electronegative heteroatoms in cyclic systems where carbon bond formation with the carbon radical-anion is energetically favored over electron transfer from the carbon radical anion to the monomer unit. Monomers like ethylene; propylene oxide; ethylene imine; cyclic sulfides, and especially vicinal episulfides like ethylene sulfide, propylene sulfide and butylene sulfide; cyclic siloxanes such as hexamethylcyclotrisiloxane and the like are advantageously used. Ethylene oxide is particularly advantageous.

Some such monomers may be described as being of the formula

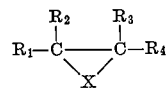

wherein X is a hetero atom contributing some instability to the ring and forming, with vicinal carbon atoms, a heterocyclic group. $R_1$, $R_2$, $R_3$ and $R_4$ are any non-interfering or non-contaminating radical such as a hydrogen, or any aryl or alkyl group. Preferably, $R_1$, $R_2$, $R_3$ and $R_4$ will each be lower alkyl groups such as those having from 1 to 6 carbon atoms and preferably wherein the total number of carbon atoms does not exceed about 15. Use of larger molecular weight compounds usually results in excessive steric hindrance of the reaction.

The carbon radical-anion formed, for example by the reaction of carbon black and sodium, can also be used as a catalyst in numerous polymerizations of vinyl-type monomers which are known to those skilled in the art as being polymerizable by anionic and free radical catalysis, for example the polymerization and copolymerization of acrylonitrile, styrene, butadiene, methacrylonitrile, isoprene, methyl methacrylate and the like. In most of this second type of polymerization, the function of the radical-anion is primarily that of an electron transfer initiator catalyst and the resulting polymers have very little if any carbon black chemically incorporated therein. Very excellent physical dispersions of carbon black in polymer result from such polymerization processes.

A third type of polymerization process utilizing the aforesaid radical-anion is that type in which a monomer of electrophilic nature such as those mentioned above, ethylene oxide, for example, is first reacted with the carbon black radical-anion to give a radical-anion species which may be represented as:

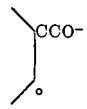

wherein the anion site is occupied by, and the anion function is preserved by, the presence of the residue of the heterocyclic compound. The formation of this species is accomplished in the same way as the carbon black-ethylene oxide type of polymer referred to above is prepared. However, in this instance, instead of continuing with the addition of more heterocyclic monomer, another monomer strongly susceptible to anionic polymerization, for example acrylonitrile, is added to form a polymer represented by:

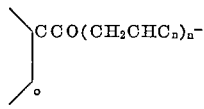

Thus anionic copolymerization can generally be carried out to form copolymers.

Termination of any of the aforementioned polymers can be accomplished by protonation or reaction with suitable other compounds capable of providing a positively-charged radical as are known to the art for terminating similar reactive polymeric sites. Among the convenient compounds used in terminating such polymers are alkyl halides like methyl iodide, bromoethylene and the like.

The yields of product, in terms of milliequivalents of any surface group which can be added per gram of carbon black, depend in large part upon the surface area, the crystallite structure and other properties of the particular carbon black being treated and upon the reactivity of the radical-anion as explained in more detail heretofore. For purposes of convenience, a large part of the illustrative work described herein has been done with a medium processing channel (MPC) black. To simplify analysis of the products described below, this black was first "cleaned" of a major portion of its volatile matter in the form of original chemical groups by heat treating the black at 2700° C. in vacuo until it had about 1200 fused carbon rings per crystallite plane and about 30 surface crystallite planes per particle. Before this heat treatment, the material had about 25 fused rings per crystallite plane and about 1300 surface crystallite planes per particle. Carbon blacks with volatile matter below 5% and advantageously below 1% are often more susceptible to substitution of large quantities of chemical groups than carbon blacks having a greater content of volatile matter because fewer side reactions compete with the desired primary reaction when such blacks are used. In addition, carbon blacks which have been scrupulously dried, for example in a vacuum at about 150° C. for 24 hours, so as to be free of free or physically bound moisture are usually required in order to obtain optimum results in accordance with the present invention. Likewise, carbons which have been heated to temperatures above about 500° C. and preferably above about 1000° C., in order to cleanse the surfaces thereof are also much preferred.

To illustrate the reactivity of some typical radical-anions prepared by processing various heat-treated commercially available carbon blacks according to the process of the invention the following Table II is set forth. Sufficient sodium was used to form a 0.5 fractional sodium monolayer in all cases.

TABLE II

| Commercial Black Preheated at 2,700° C. | Black Surface Area, Meters²/gm. | Particle size EM | Millimoles of H₂ added per gram of Black | Millimoles of H₂ per 100 Meters² of Black Surface | Percent Hydrogenation |
|---|---|---|---|---|---|
| (SRF) | 23.7 | 80 | 0.120 | 0.510 | 167 |
| (HAF) | 68.4 | 29 | 0.285 | 0.413 | 138 |
| (MPC) | 90.0 | 25 | 0.54 | 0.490 | 163 |
| (ISAF) | 114.0 | 23 | 0.660 | 0.573 | 199 |
| (HCC) | 211.6 | 12 | 1.90 | 0.514 | 173 |

Non-heat treated blacks have the following degrees of hydrogen addition when treated according to the process of the invention:

TABLE III

| Commercial Black | Millimoles per H gram of Black | Percent Reaction as Hydrogenation |
|---|---|---|
| (MPC) | 0.078 | 23.5 |
| (XCF) | 0.021 | 7.3 |
| (HAF) | 0.065 | 29.0 |

The heat-treating operation and the graphitizing effect incurred by the blacks are seen to enhance the reactivity, i.e. the degree of anion-radical formation, of carbon blacks. This is believed to be because of the decrease in the number of interfering chemical groups on the surface of the black and increase in crystallite size and ordering.

The blacks in Tables II and III are specifically identified by the symbols known to the art which are indicative of the type black and the process by which the black has been produced.

In order to point out more fully the nature of the present invention, the following specific examples are given as illustrative embodiments of the process and produced thereby.

PREPARATION OF A CARBON BLACK RADICAL-ANION

Example 1

A 500 ml. three-neck flask was fitted with a magnetic agitator, gas inlet and outlet tubes, and a mercury bubbler on the outlet tube. A septum cap, i.e. an air-tight, self-sealing elastomeric cover, was placed over the third opening of the flask.

Twenty grams of the heat treated (MPC) carbon black described above having a surface of 90 meters² per gram was placed in the flash and dried therein at about 105° C. with a stream of dry nitrogen. The nitrogen had been passed over copper at 600° C. and then through a drying agent to remove any traces of water present therein.

A quantity of sodium calculated to form 0.5 of a monolayer of sodium on the carbon black was placed in the flask through the septum cap by means of an air-tight syringe. The sodium used was dispersed in a kerosene-based hydrocarbon. This dispersion is available from the Gray Chemical Company in the nominal concentration of 40% sodium. In fact, the dispersion used contained 36.6% sodium.

The hydrocarbon dispersion medium was distilled off and the sodium and carbon agitated under dry nitrogen atmosphere at 200° C. for an hour during which time the sodium formed a partial monolayer on the carbon black. A quantity of 250 cc.'s of thoroughly dried dimethoxyethane was then added to the flask at 0° C. and the flask was heated at 50° C. for eight hours.

The resulting material contained the reactive and catalytic radical-anion of the formula

as has been described heretofore.

Example 2

The procedure of Example 1 was repeated except that a quantity of 1.45 grams sodium spheres of one-quarter inch to one-sixteenth inch in diameter was charged to the flask instead of the kerosene-based dispersion. Dimethoxyethane was thereupon added separately. There were no substantial differences between the products formed by the procedures of Examples 1 and 2. The product of Example 2 was used as a starting material in the following examples.

The data set forth in the following examples sometimes refers to "total acid" or "strong acid" analysis. The "strong acid" analysis is obtained by the following procedure:

Two grams of dry carbon black are weighed into an 8 ounce bottle and shaken therein for four hours in the presence of 50 ml. of an aqueous solution of 0.1 normal sodium bicarbonate. At the end of this period, the black is centrifugally separated off and 25 ml. of supernatant liquid is transferred into a 250 ml. Erlenmeyer flask containing about 30 ml. of distilled water and a small quantity of boiling beads. Also added to this flask is 50 ml. of 0.05 normal HCl. The contents of the flask are then boiled for twenty minutes to remove any carbonic acid present; then the contents are cooled.

The resultant liquid is black-titrated with 0.02 sodium hydroxide to neutrality as determined by a phenolphthalein end point. Then a flask run is made by performing the above steps with no carbon black.

Thereupon it is possible to determine the quantity of strong acid sites in terms of milligram atoms of hydrogen per gram of carbon black by the following relation:

$$\frac{2(\text{normality of NaOH}) (50 \text{ ml.} - \text{ml. of NaOH used for blank})}{\text{grams of carbon black}}$$

The aforementioned "total acid" analysis is obtained by the following procedure:

A sample of the carbon black to be tested is dried in a reaction flask for an hour between 230 and 250° F. under a pressure of less than 0.1 mm. Hg absolute flask is then filled with a dry inert gas such as nitrogen and allowed to come to room temperature, i.e. about 20 to 40° C. Thereupon a dilute solution of lithium aluminum hydride in bisethoxyethane is reacted with the black. After the first surge or hydrogen evolution, the sample is heated to 70° C. and stirred for several minutes. The total hydrogen evolved over the period of several minutes is utilized as a measure of total acidic hydrogen.

PREPARATION OF VARIOUS SUBSTITUTED CARBON BLACKS

Example 3—Protonation of carbon black

A quantity of 250 cc.'s of carbon radical-anion slurry was prepared in a flask in the manner described in Example 2. A quantity of 30 cc.'s concentrated hydrochloric acid was slowly added thereto at 50° C. A rise in temperature occurred. After 30 minutes, 250 cc.'s of distilled water was added and the mixture stirred for 15 minutes.

The mixture was filtered at 50° C., and the filter cake was washed with quantities of 100 ml. of water ten times bfeore being dried at 85° C. in a forced draft oven.

The product was subjected to vacuum pyrolysis to 1300° C. and gases released during this treatment were passed into a mass spectrometer. Furthermore, a sample of the product was dried to constant weight at 125° C. in a stream of dry nitrogen and burned in oxygen to form water. By these two analytical techniques it was determined that 1.08 milligram atoms of hydrogen had been attached to each gram of carbon black by the process described above.

Example 4—Carboxylated carbon black

A quantity of 250 cc.'s of carbon radical-anion slurry was cooled to 0° C. in the flask described in Example 1. Carbon dioxide was about 8 cc.'s per minute until the dispersion was saturated with the gas. Still at 0° C., the mixture was stirred for 5 minutes after the addition of carbon dioxide was completed. Thereupon the reaction was terminated by addition of 30 cc.'s of concentrated hydrochloric acid. The acid mixture was stirred for 15 minutes after which the solid product was filtered, washed and dried as described in Example 3.

The product was subjected to vacuum pyrolysis to 1300° C. and the vapors therefrom were passed through a mass spectometer for $CO_2$ analysis. The black was also subjected to a hydrogen analysis using the strong acid technique. By these techniques it was determined that 0.24 milliequivalents of carboxyl groups had been chemically bonded to each gram of carbon black.

Example 5—Peroxylated black

The 250 cc.'s of carbon radical-anion slurry used in this example differed from those of Examples 1 and 2 in that radical-anion formation was accomplished by heating at 50° C. for only four hours rather than eight hours. After the four-hour period, oxygen was bubbled through the slurry at 10 cc.'s per minute for five minutes. Then 30 cc.'s of concentrated hydrochloric acid were added to terminate any reaction. The solid product was filtered, washed and dried as described in Example 3.

The product was subjected to vacuum pyrolysis and the gases thereby evolved were passed through a mass spectrometer for analysis. The product was also subjected to total acid analysis and an oxygen analysis by neutron activation. By these techniques it was determined that 0.16 milliequivalents of peroxyl groups had been chemically bonded to each gram of carbon black.

Example 6—Carbon disulfide-modified carbon black

The 250 cc.'s of slurry used was prepared in the same manner as that used in Example 5. While the slurry was still at 50° C., 30 cc.'s of carbon disulfide was introduced into the flask through a septum cap by means of a syringe. After stirring for 30 minutes, the solids were separated from the liquid medium, washed first with ethanol, and then washed with water until the resulting filtrate was neutral. The product was dried as described in Example 3.

The product was subjected to vacuum pyrolysis and the gases thereby evolved were passed through a mass spectrometer for $SO_2$ analysis. The product was also subjected to elemental analysis for sulfur and hydrogen and to analysis for total acid. By these techniques it was determined that 0.069 milliequivalents of $-CS_2H$ groups had been chemically bonded to each gram of carbon black.

Example 7—Chlorinated carbon black

This example was a duplicate of Example 6 except that chlorine gas was substituted for carbon disulfide. The product was subjected to chemical analysis and also analysis with a mass spectrometer as has been described above. About 0.062 milliequivalents of chlorine had attached to each gram of carbon black.

Example 8—Sulfurous-acidulated carbon black

The process was a duplicate of that described in Example 6 except that sulfur dioxide was substituted for carbon disulfide.

The product was subjected to vacuum pyrolysis and the gases thereby evolved were passed through a mass spectrometer for $SO_2$ analysis. The product was also subjected to elemental hydrogen and sulfur analysis and to a total acid determination. By these techniques it was determined that 0.144 milliequivalents of sulfurous acid groups, i.e. —$SO_2H$ had been chemically bonded to each gram of carbon black.

Example 9—Alkylated blacks

A quantity of 250 cc.'s of the carbon black radical-anion slurry was prepared as described in Example 2. To this slurry was added 50 cc.'s of n-bromobutane. The resulting mixture was stirred at 50° C. for 30 minutes before being terminated with acid. The solid product was recovered and dried and described in the preceding examples.

This procedure was also followed substituting bromoethane for bromobutane. The carbon atoms of this latter experiment were $C^{14}$ atoms and the washed product was subjected to a radioactivity count in order to confirm the quantity of —$C_2H_5$ groups on the carbon black.

Furthermore, both ethylated and butylated products were subjected to vacuum pyrolysis with the gases thereby evolved being subjected to testing with a mass spectrometer. It was determined that there was 0.22 milliequivalents of butyl groups per gram on the butylated carbon black and 0.24 milliequivalents of ethyl groups per gram on the ethylated black.

Example 10—Carbonyl sulfide addition product

The process of Example 6 was repeated excepting carbonyl sulfide (COS) was substituted for carbon disulfide.

The product was subjected to vacuum pyrolysis and the gases thereby evolved were passed through a mass spectrometer for analysis. The product was also subjected to elemental analysis for hydrogen and sulfur and to a total acid determination.

By these techniques it was determined that 0.063 milliequivalents of thiol acid (—COSH) groups had been chemically bonded to each gram of carbon black.

Example 11—Carbon monoxide addition product

The process of Example 6 was repeated excepting carbon monoxide was substituted for carbon disulfide.

The product was subjected to vacuum pyrolysis and the gasses evolved therefrom were passed through a mass spectrometer for analysis. Oxygen was also determined by the neutron activation method. By these techniques it was determined that 0.11 milliequivalents of carbonyl groups had been chemically bonded to each gram of carbon black.

Example 12—Nitroso-substituted carbon black

The radical-anion slurry used was, in the instant example, prepared according to the method of Example 1, except that immediately after the addition of dimethoxy ethane, NO gas was bubbled through the dispersion at the rate of 15 cc.'s per minute for four hours. The temperature was maintained at 50° C. during this period. After the four hours, the reaction was terminated with 30 grams of hydrochloric acid, and the product was recovered by filtration, washing with water and drying was described heretofore.

The product was subjected to vacuum pyrolysis and the gases evolved therefrom were passed through a mass spectrometer for NO analysis. Elemental nitrogen analysis was also carried out on the product. By these techniques it was determined that 0.22 milliequivalents of nitroso groups had been chemically bonded to each gram of carbon black.

Example 13—Alcohol-reacted black

A radical-anion slurry was prepared in the same way as in Example 5. To this slurry was added 30 cc.'s of ethanol. The resulting mixture was stirred for 30 minutes then filtered. The resultant solid products were washed with alcohol and dried.

The product was subjected to vacuum pyrolysis and the gases evolved therefrom were passed through a mass spectrometer for analysis and were analyzed for elemental hydrogen. By these techniques it was determined that 0.14 multiequivalent of 1-hydroxyethyl groups has been chemically bonded to each gram of carbon black.

Example 14—Allyl-substituted black

A radical anion slurry was prepared in the same way as in Example 5, Thereafter 30 cc.'s of allyl bromide were added dropwise to the flask over a 30 minute period After this addition had been completed, the contents of the flask were refluxed for another one-half hour at the end of which time 15.0 cc.'s of concentrated HCl were added to terminate the reaction.

The solid product in the flask was filtered, washer thoroughly first with 500 cc.'s of alcohol then 500 cc.'s of ethanol and dried to constant weight at 90° C. in a forced draft oven.

A sample of the resultant solid product was extracted with ethyl alcohol over a 24 hour period. The extracted material was analyzed for hydrogen. An analysis for hydrogen indicated 0.063 milliequivalents of

—$CH_2CHCH_2$ groups present for each gram of carbon black. Furthermore, the product was subjected to a $KMnO_4$ oxidation and the gaseous products thereof were subjected to analysis with a mass spectrometer.

Examples illustrating the utillity of the instant invention in polymerization reactions and novel products produced thereby follow:

Example 15

Fifty grams of a graphitized carbon black of the MPC type was processed with 0.20 grams of sodium, i.e. enough to form 0.057 of a theoretical monolayer of sodium. This processing was accomplished in an inert atmosphere by the method set out in Example 2, but no solvent was immediately added to the sodium-carbon material. Instead, the resulting sodium-carbon was cooled to —78° C. by inserting the reaction flask in a trichloroethylene-Dry Ice bath. Then the inert nitrogen purge was discontinued and the flask evacuated.

In a separate flask about 40 grams of ethylene oxide were cooled in liquid nitrogen to freezing and then allowed to flask distill into the reaction flask containing the sodium and carbon by opening a stopcork between the two flasks.

Thereupon a quantity of 500 grams of tetrahydrofuran solvent was added to the reaction mixture and it was allowed to react for 2 hours at 50° C.

Thereupon the reaction was terminated by the addition of 5 grams of methyl alcohol, and the solid product of the reaction was recovered by filtration, washed and dried at 60° C. in an air oven.

Analysis of this solid product showed it to have 77.4 parts per weight of polyethylene oxide chemically bound as polymer to each 100 parts of carbon black. The average molecular weight of the polymer averaged 4000. This meant an average chain contained about 106 or so monomeric units.

Example 16

The run described in Example 14 is repeated using thiirane instead of ethylene oxide as the monomer. The resulting product is relatively gray in color when compared to the carbon black used as the starting material. Molecular weights of polymer chains average about 2500.

Example 17

The run described in Example 14 is repeated up until but not including the point at which methanol was added.

At this point, 53 parts of acrylonitrile which had been cooled to —78° C. were added to the reaction mix. The mixture was stirred for one hour and increase in viscosity was visually noticeable as the acrylonitrile polymerized on the living polymer chains of polyoxethylene.

The reaction is then terminated as described in Example 14 and the product recovered and analyzed as disclosed therein. Analysis confirmed the attachment of acrylonitrile segments of polymer to polyoxethylene chains and the further attachment of the latter chains to the carbon black crystallite.

Example 18

Example 14 was repeated changing it in only two respects. The manipulative procedure was modified so that the ether solvent was added before the ethylene oxide monomer and the carbon black used was a graphitized high color channel (HCC) black. Only that quantity of sodium required to give a 0.057 monolayer of sodium on the black was utilized.

Polymer chains having a molecular weight of over 2250 were formed on the black. The total weight of polymer was about 106% of the weight of carbon black to which it was bonded.

Examples 19 to 22

Each of Examples 15 through 18 was repeated using dimethoxyethane as the solvent. The results were essentially similar to the results obtained with tetrahydrofuran.

Examples 23 to 25

The procedure described in Example 17 was repeated using styrene, butadiene and methyl methacrylate instead of acrylonitrile. Inspection of polymer product formed showed that such polymer was substantially free of chemical bonding to carbon black. Thus in each instance, the usefulness of the catalyst in anionic polymerization of ethylenically-unsaturated monomers was clearly demonstrated.

It is of course to be understood that the foregoing examples are intended to be illustrative and that various changes can be made in the reactants, proportions and conditions set forth therein without departing from the spirit of the invention as dezned in the appended claims.

What is claimed is:

1. A composition comprising a solvating ether medium and an effective number of negatively-charged carbon particles having sites represented by the formula:

wherein

represents a portion of the carbon particle surface, each — represents a carbon-anion site, and each ° represents a carbon-radical site.

2. A composition as defined in claim 1 wherein said solvating ether is an alkoxyalkane, tetrahydrofuran, or an alkyl tetrahydrofuran.

3. A composition as defined in claim 2 wherein said organic solvent is dimethoxyethane.

4. A composition comprising a solvating ether medium; an effective number of negatively-charged carbon particles having sites represented by the formula:

wherein

represents a portion of the carbon particle surface, each — represents a carbon-anion site, and each ° represents a carbon-radical site; and a positively-charged alkali or alkaline earth metal cation.

5. A composition as defined in claim 4 wherein said metal cation is a sodium cation.

6. A composition as defined in claim 4 wherein said metal cation is a potassium cation.

7. A composition as defined in claim 4 wherein said metal cation is a lithium cation.

8. A composition as defined in claim 4 wherein said metal cation is a calcium cation.

9. A composition as defined in claim 4 wherein carbon present in said composition is a heat-treated carbon black of low volatile content.

10. A carbon-alkali metal composition for use in preparing catalytic compositions comprising carbon black having a volatile content of less than about 5% and produced by heat treatment of carbon black at temperatures of above about 500° C., said heat treated black having at least a partial monomolecular layer thereover of an alkali metal.

11. A composition of matter arising as a product of reaction between:
(A) a carbon black which has been treated by coating at least a partial monomolecular layer of an alkali or alkaline earth metal thereon and dispersing said coated carbon black in a solvating ether thereby forming a catalytically active carbon surface represented by the formula:

wherein

represents a portion of the carbon surface, each — represents a carbon-anion site, and each ° represents a carbon-free radical site; and
(B) a first member reagent selected from the group consisting of hydrogen and electrophilic group contributing reagents and reacted at said carbon-anion sites of said treated carbon black; and
(C) a second member reagent selected from the group consisting of hydrogen and free radical traps and reacted at said carbon-free radical sites of said treated carbon black.

12. A composition of matter as defined in claim 11 wherein said first member reagent is hydrogen and said second member reagent is selected from the group consisting of hydrogen and free radical traps.

13. A composition of matter as defined in claim 11 wherein the electrophilic group of said first member reagent is a carboxyl group and said second member reagent is selected from the group consisting of hydrogen and free radical traps.

14. A composition of matter as defined in claim 11 wherein the electrophilic group of said first member reagent is a peroxy group and said second member reagent is selected from the group consisting of hydrogen and free radical traps.

15. A composition of matter as defined in claim 11 wherein the electrophilic group of said first member reagent is a —CS$_2$H group and said second member reagent is selected from the group consisting of hydrogen and free radical traps.

16. A composition of matter as defined in claim 11 wherein said second member reagent is a free radical trap consisting of halogen and said first member reagent is selected from the group consisting of hydrogen and electrophilic group contributing reagents.

17. A composition of matter as defined in claim 11 wherein the electrophilic group of said first member reagent is a sulfurous acid group and said second member reagent is selected from the group consisting of a hydrogen and free radical traps.

18. A composition of matter as defined in claim 11 wherein the electrophilic group of said first member reagent is an alkyl group and said second member reagent is selected from the group consisting of hydrogen and free radical traps.

19. A composition of matter as defined in claim 11 wherein said second member reagent is a free radical trap containing a carbonyl group and said first member reagent is selected from the group consisting of hydrogen and electrophilic group contributing reagents.

20. A composition of matter as defined in claim 11 wherein said second member reagent is a free radical trap containing a nitroso group and said first member reagent is selected from the group consisting of hydrogen and electrophilic group contributing reagents.

21. A composition of matter as defined in claim 11 wherein the electrophilic group of said first member reagent is a group of the formula

wherein R is an alkyl group and said second member reagent is selected from the group consisting of hydrogen and free radical traps.

22. A composition of matter as defined in claim 11 wherein the electrophilic group of said first member reagent is an allyl group and said second member reagent is selected from the group consisting of hydrogen and free radical traps.

23. A composition of matter as defined in claim 11 wherein the electrophilic group of said first member reagent is a carbonyl sulfide group and said second member reagent is selected from the group consisting of hydrogen and free radical traps.

24. A process for making a catalyst comprising (1) coating at least a partial monomolecular layer of an alkali or alkaline earth metal on carbon black, and (2) dispersing said precoated carbon black in a solvating ether thereby forming a free-radical and anion site containing carbon black surface of the formula:

wherein

represents a portion of the carbon surface, each — represents a carbon-amine site, and each ° represents a carbon-free radical site.

25. A process as defined in claim 24 wherein said solvating ether is dimethoxy ethane.

26. A process as defined in claim 24 wherein said solvating ether is tetrahydrofuran or an alkylated tetrahydrofuran.

27. A process as defined in claim 24 wherein said coating material is sodium.

28. A process for making an anionic polymerization catalyst comprising:
 (1) heat-treating carbon black to remove a major portion of chemical substituents thereon,
 (2) coating at least a partial monomolecular layer of an alkali or alkaline earth metal thereon, and
 (3) dispersing said coated carbon black in a solvating ether.

29. A method of preparing compositions of matter in which carbon black is in chemical combination with a molar quantity of a first member selected from the group consisting of hydrogen and electrophilic group-contributing reagents and a second member selected from the group consisting of hydrogen and free radical traps comprising:
 (1) coating at least a partial monomolecular layer of an alkali or alkaline earth metal or carbon black,
 (2) slurrying said coated carbon black in a solvating ether,
 (3) reacting a reagent selected from the aforesaid first member and second member with said carbon black in said solvating ether, and
 (4) recovering the solid carbon-black-based product.

30. A process as defined in claim 29 wherein said second member is carbon monoxide.

31. A process as defined in claim 29 wherein said second member is a halogen.

32. A process as defined in claim 29 wherein said second member is oxygen.

33. A process as defined in claim 29 wherein said second member is an alkyl alcohol.

34. A process as defined in claim 29 wherein said second member is NO.

References Cited
UNITED STATES PATENTS

| | | | |
|---|---|---|---|
| 2,408,696 | 10/1946 | Smallwood | 106—307 |
| 2,631,107 | 3/1953 | Leatherman | 106—307 |
| 2,835,343 | 5/1958 | Wolff et al. | 252—444 XR |
| 2,836,633 | 5/1958 | Esmay et al. | 252—447 XR |
| 2,861,983 | 11/1958 | Fotis | 252—447 XR |
| 2,867,540 | 1/1959 | Harris | 106—307 |
| 2,920,976 | 1/1960 | Damusis | 106—307 |
| 2,962,431 | 11/1960 | Gladrow | 252—444 XR |
| 2,965,689 | 12/1960 | Roebuck et al. | 252—447 XR |
| 3,010,794 | 11/1961 | Friauf et al. | |
| 3,140,192 | 7/1964 | Jordan et al. | 106—307 |
| 3,205,211 | 9/1965 | Kibler et al. | 252—447 XR |
| 3,279,935 | 10/1966 | Daniell et al. | 106—307 |
| 3,330,799 | 7/1967 | Voet | 106—307 XR |

PATRICK P. GARVIN, Primary Examiner

U.S. Cl. X.R.

23—209.1, 209.2; 106—307, 308; 252—426, 428, 438, 441, 443, 444, 447; 260—2, 304, 33.2, 41, 41.5, 80, 88.7, 89.5, 94.2